No. 611,329. Patented Sept. 27, 1898.
T. J. LINDSAY.
BICYCLE DRIVING GEAR.
(Application filed July 24, 1897.)
(No Model.) 2 Sheets—Sheet 1.
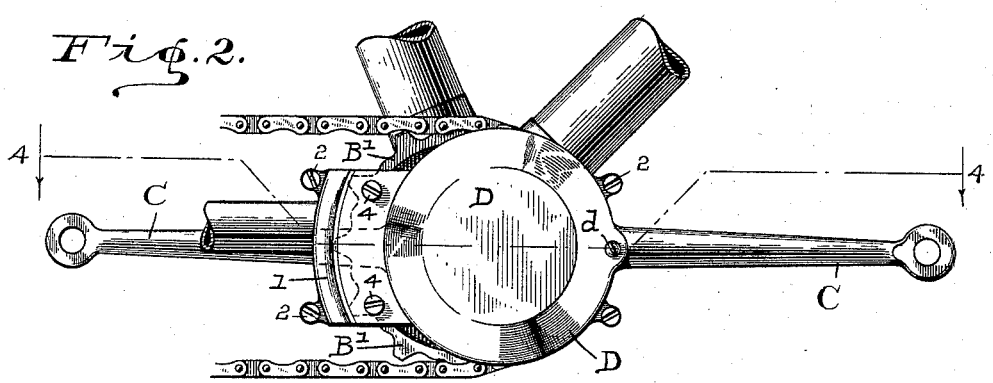
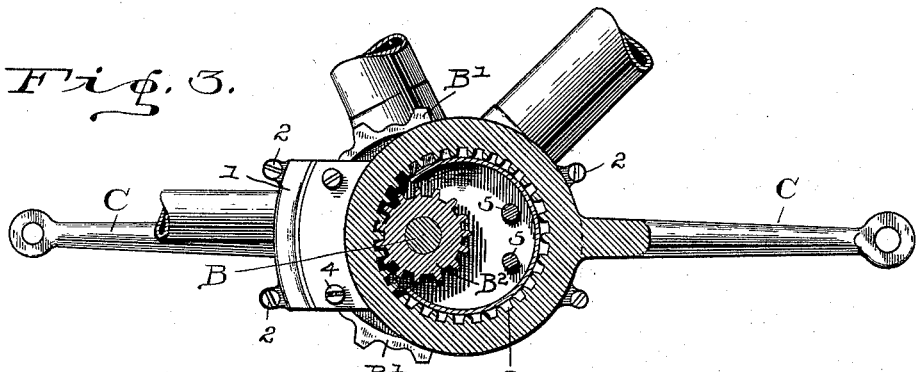
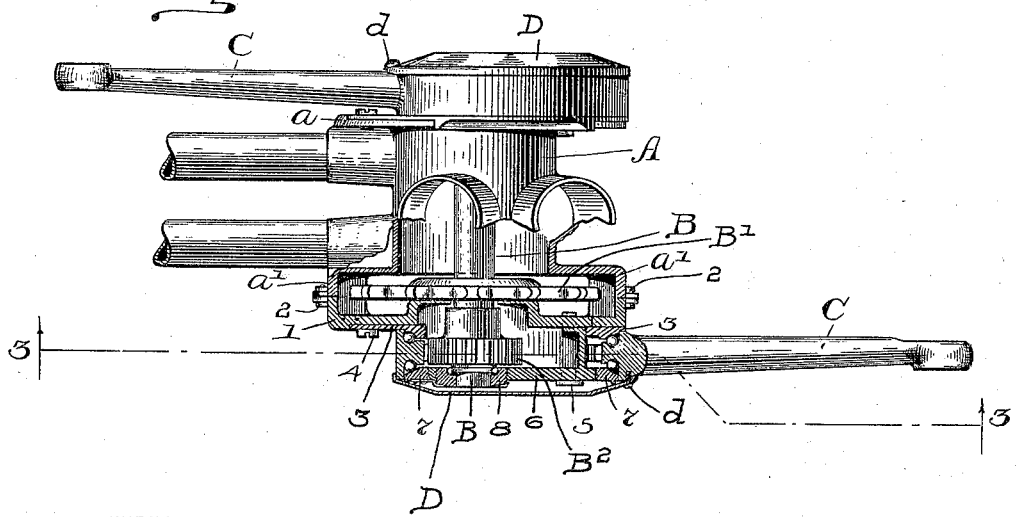
WITNESSES:
F. W. Woerner.
J. A. Walsh.
INVENTOR
Thomas J. Lindsay,
BY
Chester Bradford,
ATTORNEY.

No. 611,329. Patented Sept. 27, 1898.
T. J. LINDSAY.
BICYCLE DRIVING GEAR.
(Application filed July 24, 1897.)
(No Model.) 2 Sheets—Sheet 2.

WITNESSES:
F. W. Woerner,
J. A. Walsh.

INVENTOR
Thomas J. Lindsay
BY
Chester Bradford,
ATTORNEY.

UNITED STATES PATENT OFFICE.

THOMAS J. LINDSAY, OF LAFAYETTE, INDIANA.

BICYCLE DRIVING-GEAR.

SPECIFICATION forming part of Letters Patent No. 611,329, dated September 27, 1898.

Application filed July 24, 1897. Serial No. 645,784. (No model.)

*To all whom it may concern:*

Be it known that I, THOMAS J. LINDSAY, a citizen of the United States, residing at Lafayette, in the county of Tippecanoe and State of Indiana, have invented certain new and useful Improvements in Bicycle Driving-Gear, of which the following is a specification.

My present invention consists in certain improvements upon that for which Letters Patent of the United States No. 545,408 were granted me August 27, 1895, whereby the construction of the vehicle driving-gear therein described is simplified and improved and the operation thereof rendered more perfect, all as will be hereinafter more particularly described and claimed.

Figure 1:
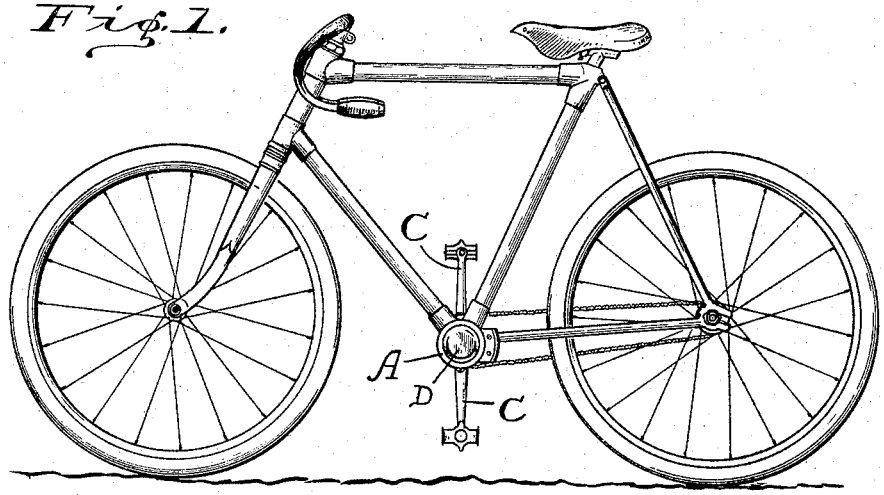
Figure 5:
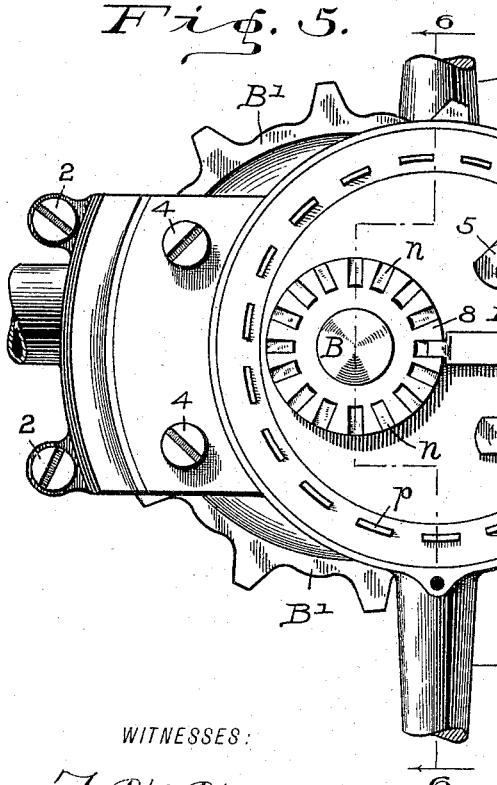

Referring to the accompanying drawings, which are made a part hereof, and on which similar letters and numerals of reference indicate similar parts, Figure 1 is a side elevation of a bicycle equipped with my invention in its improved form; Fig. 2, a side elevation from the opposite side, on an enlarged scale, of that portion of the machine where my invention is located, the pedal-arms being turned horizontally instead of vertically; Fig. 3, a similar view, except that the gearing is shown in section, as seen from the dotted line 3 3 in Fig. 4; Fig. 4, a view, partly in top plan and partly in horizontal section, as seen from the dotted line 4 4 in Fig. 2; Fig. 5, a view similar to a portion of Fig. 2, on a still further enlarged scale, but with the cap covering the end of the pedal mechanism removed; and Fig. 6, a vertical sectional view as seen from the dotted line 6 6 in Fig. 5.

In said drawings the portions marked A represent the "hanger" or short cylindrical portion of the frame, through which the crank-shaft of the bicycle passes; B, said crank-shaft; C, the pedal or crank arms, and D a dust-cap.

The hanger A has at one end a flange-plate $a$ and at the other ends wings $a'$, and to this plate and to these wings the structure carrying the gearing is attached. Upon the end where the sprocket-wheel is located there is a yoke 1, which is connected to the flanges $a'$ by small bolts 2, and to this yoke is secured a plate 3 by the machine-screws 4 and 5. The plate 3 is formed to constitute a ball-race half. There is an outer plate 6, which has a circular flange $f$ extending inwardly therefrom for about three-quarters of its circumference and which bears against the plate 3. The pinion $B^2$ passes through the open side of the flange $f$ and into contact with the internal gear formed integrally with the pedal-arms. In order that the proper adjustments may be had, this outer plate is composed of three separate portions 6, 7, and 8, the portion 6 being screw-threaded upon its outer edge and having the rim 7, which also forms a ball-race half for one of the outer ball-bearings, mounted thereon, and the portion 8 being also screw-threaded and mounted within a smaller perforation within the plate 6, but to one side of the center, and also forming the outer ball-race half for the balls $b$ of the ball-bearings which support the axle in place. Both the bearings for the shaft and the bearings for the pedal-arms are thus brought substantially in line, and the structure which supports them is a continuous structure, so that a variation of relation between said ball-bearings is impossible. The part 6 is, as will be readily understood, a fixed part, and the parts 7 and 8, while adjusted in a direction longitudinally of the crank-shaft, are not variable in relation to said part 6 in any other direction. The part 6 of said plate has an inwardly-extending flange, which passes through and bears against the opposing surface of the yoke part 1 and is also in contact with the plate 3, which is on the opposite side of the gear from the plate composed of the parts 6, 7, and 8. This construction is best shown in Figs. 4 and 6.

Figure 6:
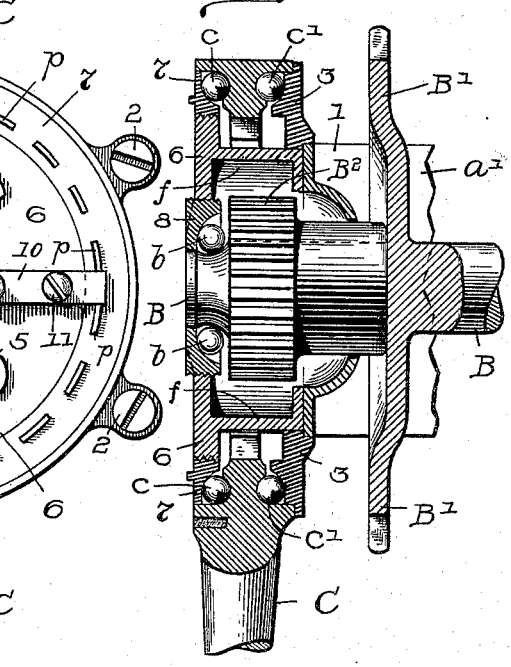

The shaft B occupies the usual position of a pedal-shaft, passing through the hanger A, and is supported by the balls $b$, resting against a cone on the outer end of said shaft and against the ball-race halves 8, as best shown in Fig. 6. Said shaft carries the usual sprocket-chain wheel $B'$ and a pinion $B^2$, which are either formed integrally with said shaft or secured fixedly thereon much as in my former patent, above mentioned. As will be noticed, however, the ball-races are at the extreme outer ends within the plate parts 8, where not only are they better supported, but where the bearings therefor can be much more conveniently adjusted.

The means of adjustment has already been partially described, as it involves the three-part plate composed of the parts 6, 7, and 8, said parts 7 and 8 being adjustable on the part 6, and as they at the same time form ball-race halves the ball-races are thereby adjusted. In order that these adjustments may be securely held at any desired point, I have provided on the plate parts 7 numerous projections $p$ and have formed in the part 8 numerous notches $n$. A detent 10 is secured by means of screws 11 upon the plate 6, and one of its ends is formed to fit closely between the notches $p$ and the other to fit closely into the notches $n$, as best shown in Fig. 5. Manifestly by loosening these screws and withdrawing the detent 10 from engagement the parts 7 or 8 may be revolved to any desired point, and after being so revolved by forcing the detent into place and tightening the screws they are there held strongly and rigidly and the adjusted relation between the parts maintained. The two sides of the structure being firmly tied together by means of the bolts 5 no variation of relation is otherwise permitted.

The pedal or crank arms C, like those in my above-mentioned Letters Patent, are continued into rings which form rims for the gear structure, as best shown in Fig. 6, and are provided with internal gear-teeth, which engage with the pinion $B^2$ on the shaft B, as best shown in Fig. 3. They run in ball-bearings, as shown, each being carried by two sets of balls $c$ and $c'$.

The dust-caps D cover the ends of the structures containing or embodying the gearing, but are secured to the rims, which form the continuations of the pedal-arms C. As best shown in Fig. 4, said caps are flanged and fit over said rims. They are secured from accidental removal by screws $d$. As these caps are flanged onto and fixedly secured to the crank-arms and revolve therewith, they of course leave no interstices through which dust may pass, and the mechanism is thus absolutely protected from dust at the points where it has usually been most difficult to prevent its intrusion.

Having thus fully described my said invention, what I claim as new, and desire to secure by Letters Patent, is—

1. The combination, in a bicycle driving mechanism, of a pedal-shaft mounted in suitable bearings in a surrounding shell or casing forming part of the bicycle-frame and provided with pinions upon its ends and the usual sprocket or chain wheel, suitable ball-race-carrying structures carried on the hanger or frame, said ball-race structure including the plate composed of the parts 6, 7 and 8, said parts 7 and 8 forming ball-race halves and adjustable in a direction longitudinal of the shaft on said part 6, substantially as set forth.

2. The combination, in a bicycle driving mechanism, of the shell or hanger, plates supported from the ends of said shell or hanger, bearings, as 8, carried by said plates at the extreme outer ends of the structure, and a pedal-shaft mounted in said bearings and thus carried by its extreme ends and at points outside the gearing, substantially as shown and described.

3. The combination, in a bicycle driving mechanism, with the pedal-shaft and driving-gear, of an outer plate 6 having an adjustable rim 7 which forms a ball-race half for an outer ball-bearing, a part 8 which forms a ball-race half for the inner ball-bearing, said parts 7 and 8 having projections and depressions and being respectively secured to and adjustable upon the part 6, and a detent whereby said parts are held in adjusted relation, substantially as shown and described.

4. The combination, in a bicycle driving-gear, of the hanger A, a shaft B inclosed within said hanger and carrying the sprocket-wheel B' and pinion $B^2$, pedal or crank arms C continued into rings which form rims for the outer portions of the gear structure and which are provided with internal gear-teeth which engage with the pinions on the shaft, and bearings for said rim and said shaft including the plates 3 and 6, the latter having the rim 7 and part 8, said parts 7 and 8 being adjustable in relation to said part 6, substantially as set forth.

5. In a bicycle driving-gear, the combination, of the frame or hanger, the separate structure attached to the side thereof having a bearing for the end of the shaft in its outside portion, said shaft mounted with its end in said bearing and provided with a gear-wheel within said structure alongside said bearing, the crank-arm formed with a rim on its inner end which is mounted on bearings on the periphery of said structure and is formed with internal gear which engages the gear-wheel on the shaft, all substantially as set forth.

In witness whereof I have hereunto set my hand and seal, at Indianapolis, Indiana, this 21st day of July, A. D. 1897.

THOMAS J. LINDSAY. [L. S.]

Witnesses:
CHESTER BRADFORD,
JAMES A. WALSH.